US010689235B1

(12) United States Patent
Dongarra

(10) Patent No.: US 10,689,235 B1
(45) Date of Patent: Jun. 23, 2020

(54) PRY DOLLIE

(71) Applicant: John Allen Dongarra, West Valley, UT (US)

(72) Inventor: John Allen Dongarra, West Valley, UT (US)

(73) Assignee: John Allen Dongarra, W.V.C., UT (US)

( * ) Notice: Subject to any disclaimer, the term of this patent is extended or adjusted under 35 U.S.C. 154(b) by 0 days.

(21) Appl. No.: 15/731,958

(22) Filed: Sep. 1, 2017

(51) Int. Cl.
*B23P 19/02* (2006.01)
*B66F 15/00* (2006.01)
*B21D 1/12* (2006.01)

(52) U.S. Cl.
CPC ................ *B66F 15/00* (2013.01); *B21D 1/12* (2013.01)

(58) Field of Classification Search
CPC .............. B66F 15/00; B21D 1/12; B21D 1/00
See application file for complete search history.

(56) References Cited

U.S. PATENT DOCUMENTS

D503,604 S * 4/2005 Liou ................................ D8/47
7,039,993 B1 * 5/2006 Smith ................. B25B 27/0028 254/25
7,226,036 B1 * 6/2007 Wellman, Jr. ......... E04G 21/167 254/120
7,438,279 B2 * 10/2008 Eby ......................... B25C 11/00 254/25
8,177,191 B2 * 5/2012 Liou ......................... B25F 1/00 254/115
2003/0101791 A1 * 6/2003 Ritter ....................... B21D 1/06 72/705
2004/0069978 A1 * 4/2004 Whelan .................... B25G 1/06 254/25
2010/0314593 A1 * 12/2010 Fan .......................... B25G 3/38 254/25

* cited by examiner

*Primary Examiner* — Lee D Wilson

(57) ABSTRACT

One embodiment of a hand held prying tool and of the type having a pry bar handle (1) which communicates at its connecting point with the foot (2) and the ability to connect to many different pushing surfaces (7) on end of the foot. This tool is made of a strong material to withstand leverage energy and being hammered upon. This tool makes transferring energy to an area that needs pushed upon much easier and efficient. Other embodiments are described and shown.

7 Claims, 2 Drawing Sheets

Figure 5:
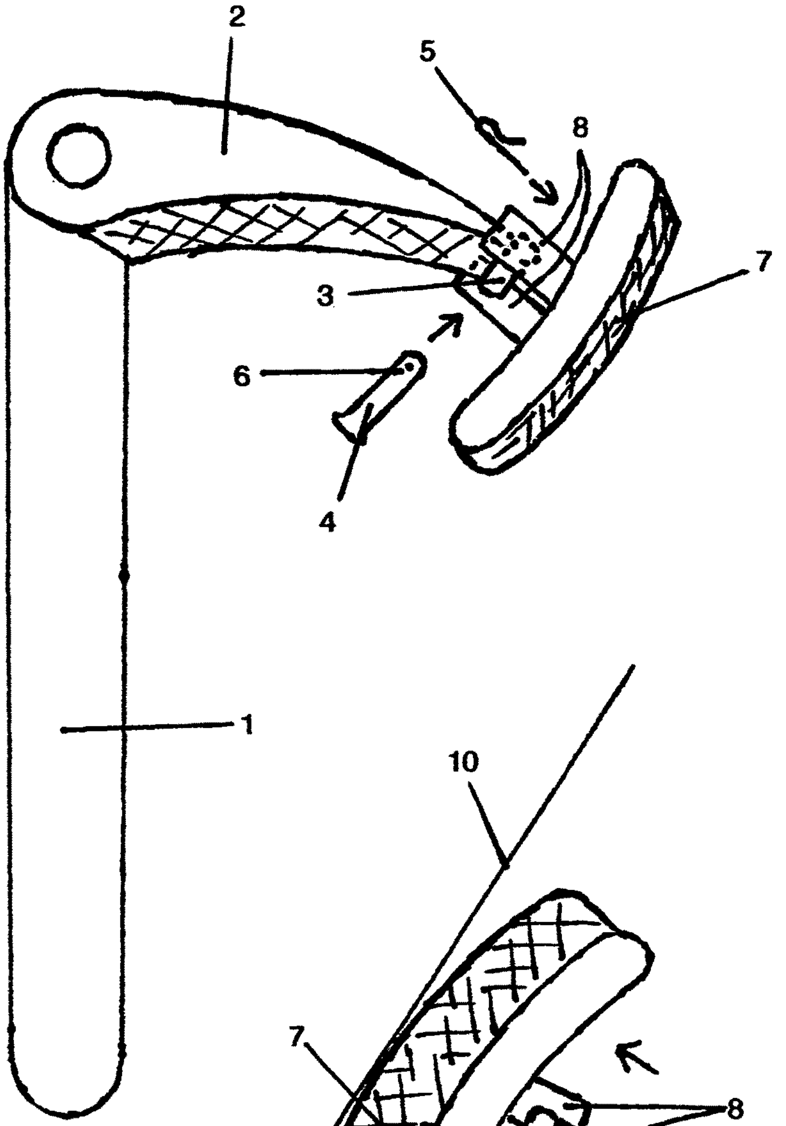

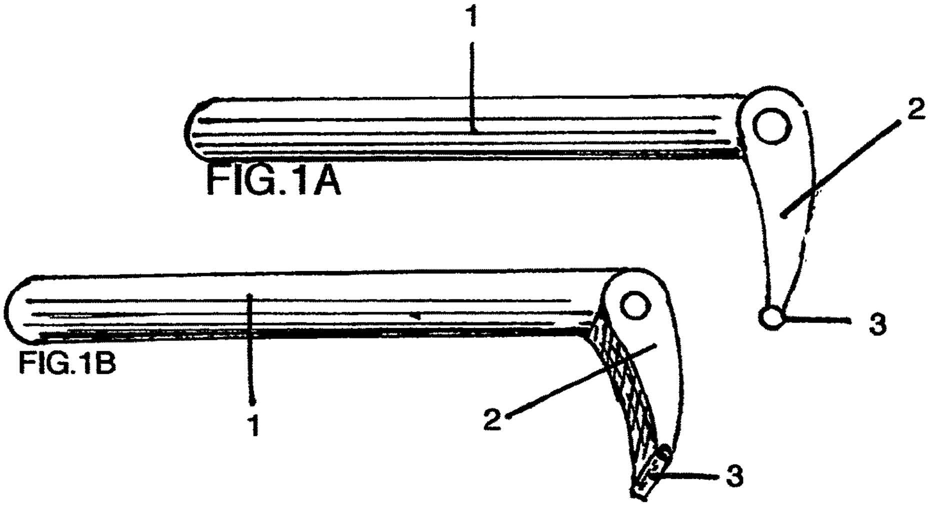
FIG.1A
FIG.1B
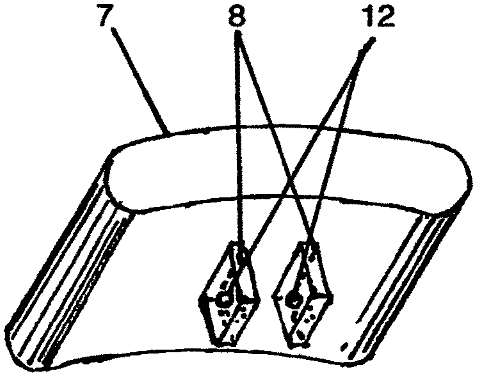
FIG.2A
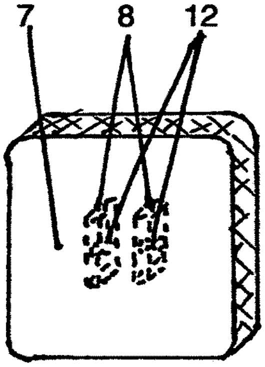
FIG.2B
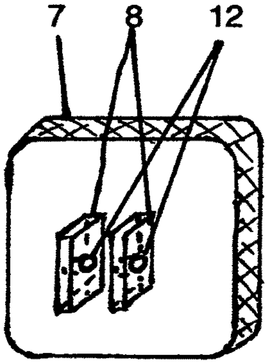
FIG.2C
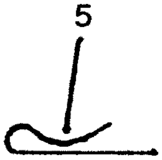
FIG.3
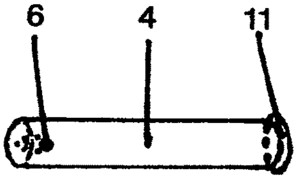
FIG.4A
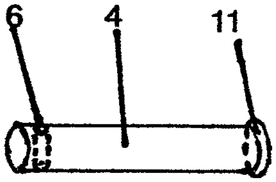
FIG.4B

PRY DOLLIE

CROSS-REFERENCE TO RELATED APPLICATIONS

This application claims the benefit of provisional patent application Ser. No. 62/447,244, filed 2017 Jan. 17 by the present inventor.

BACKGROUND

Technical Field

The present invention relates to pry bars and more specifically to a broad pushing area and technique to use.

Prior Art

The following is a tabulation of prior art that presently appears relevant:

| U.S. Patents | | |
|---|---|---|
| Pat. No. | Issue Date | Inventor |
| US11492874 | 2006 Jan. 12 | Pi-Hsia Chang |
| US12117067 | 2008 May 08 | Rafal P. Stawarski |

Body shops for ever have had the problem of pushing out dents in odd places. Its always best to try pushing and hammering out dents before welding anything to them to pull them out if possible.

Sometimes you could get a pry bar into tight places to push out a dent but it would leave outward dimples on the surface being pushed upon from the points on the tip of the pry bar and also stretch the metal. Then you were left to hammer and dolly it back into the best shape you could before applying body filler. It is always time consuming.

the disadvantages of the pry bar are:

(a) Stretching of the metal.

(b) Dimpling of the metal.

(c) Sometimes tearing of the metal.

(d) Stretching, dimpling and tearing the metal makes it weak and brittle. In the case of a tear the metal would need to be welded back together in which the heat would distort the metal and make it even weaker.

SUMMARY

Pry bars are a handle and foot to provide leverage and a pointed end to wedge in-between two points to separate them.

Advantages

Accordingly several advantages of one or more aspects are as follows: to be able to push on points with a desired shape and contour without dimpling, stretching or tearing with a great deal of leverage force in places previously inaccessible by other tools. On metal it avoids having to weld pins or tabs for pulling out imperfections and keeps the integrity of the metal without warping or weakening it. Another advantage is that it will hold your contour and shape in place with leverage so you can hammer from the other side more effectively to straiten metals if needed. You can also quickly change the pushing surface to any number of attachments to best fit the shape and contour desired. The movable pushing surface on the tool also keeps it flat to the surface being pushed upon with evenly distributed force. Other advantages of one or more aspects will be apparent from a consideration of the drawings and ensuing description.

DRAWINGS—FIGURES

In the drawings, closely related figures have the same number but different alphabetic suffixes.

Figure 6:
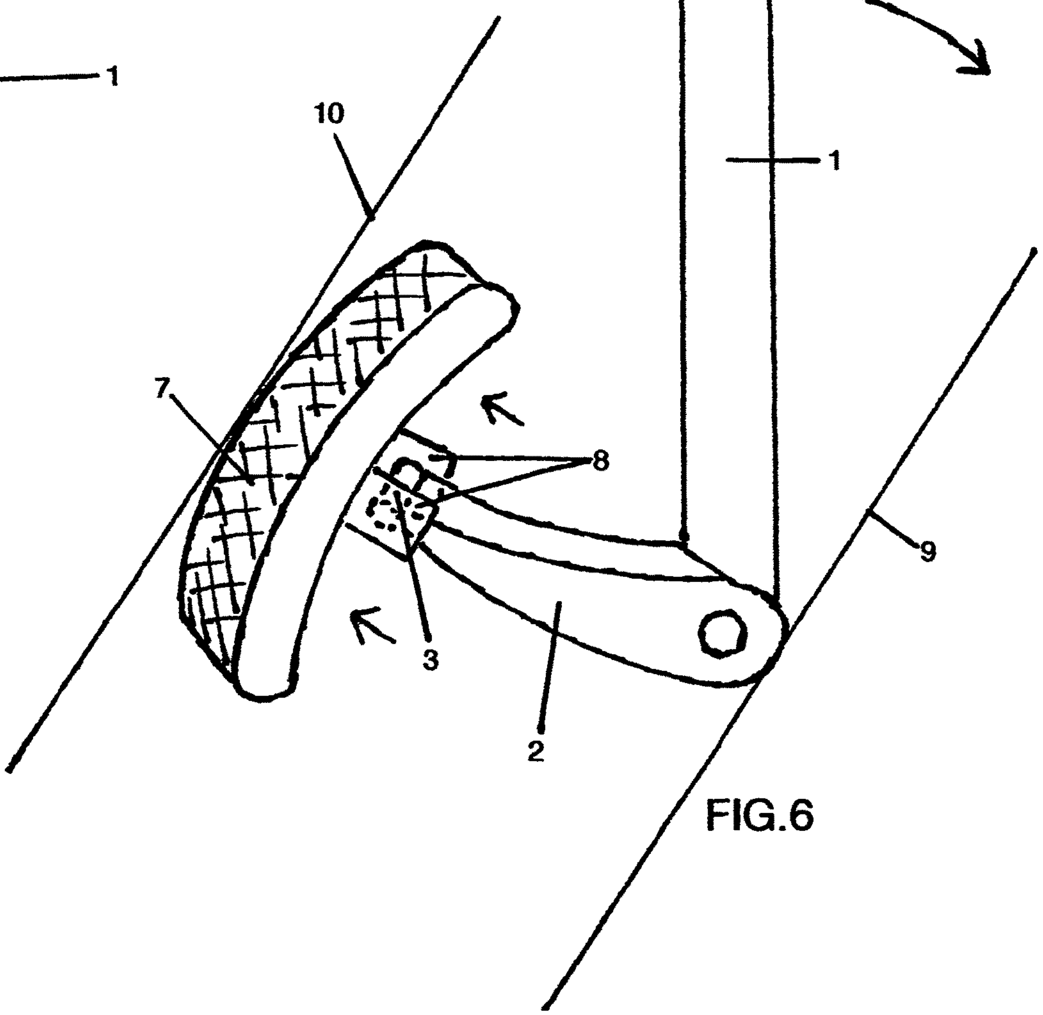

FIG. 1A to 1B show a side view of one embodiment, the basic handle, foot and hollow tube FIG. 2A to 2C show different angles of another embodiment, the basic pushing surface FIG. 3 shows another embodiment in entirety, the retaining pin clip FIG. 4A to 4B show different angles of another embodiment, the retaining pin FIG. 5 show the assembly of all embodiments FIG. 6 show the assembled complete tool's mechanics

| Drawings-Reference | Numerals |
|---|---|
| 1 pry bar handle | 7 pushing surface face |
| 2 foot | 8 pushing surface attachment bracket |
| 3 hollow tube | 9 leverage surface |
| 4 retaining pin | 10 surface to be pushed upon |
| 5 retaining pin clip | 11 widened head of retaining pin |
| 6 hole in retaining pin | 12 holes in attachment bracket |

DETAILED DESCRIPTION—FIGS. 1A AND 1B—FIRST EMBODIMENT

One embodiment of this tool illustrated in FIG. 1A (strait side view) and FIG. 1B (off set side view). The tool has a pry bar handle 1, A foot 2 and a hollow tube 3 attached to the tip of the foot 2. All of which can be made of any type of metal, hard plastics or composites.

This can be made to any size desired for different applications.

DETAILED DESCRIPTION—FIGS. 2A-2C—SECOND EMBODIMENT

Another embodiment of this tool is the pushing surface head illustrated in FIG. 2A (bottom side view), FIG. 2B (top pushing surface view) and FIG. 2C (bottom attaching side view). The tool has a pushing surface face 7 and pushing surface attachment bracket 8 with holes in attachment bracket 12 in both arms the same size as the inside diameter of the hollow tube 3 chosen to use. This attachment bracket 8 is attached to the center of the under side of the pushing surface face 7. The pushing surface attachment bracket 8 arms are made just wide enough to fit to both ends of the hollow tube 3. All of which can be made of any type of metal, hard plastics or composites etc. The pushing surface can also be made to any size, shape or contour to fit your needs.

This embodiment can also be made to any size desired for different applications.

DETAILED DESCRIPTION—FIG. 3—THIRD EMBODIMENT

Another embodiment of this tool is illustrated in FIG. 3 (side view) is the retaining pin clip 5. This is to fit through the hole in retaining pin 6 to hold it in place when assembled and make it quick to remove the retaining pin 4 and interchange pushing surface head FIG. 2A-2C. This can be made of any type of metal, hard plastic or composite. It can be made any size as long as it will fit through the hole in the retaining pin 6.

DETAILED DESCRIPTION—FIG. 4A AND 4C—FOURTH EMBODIMENT

Another embodiment of this tool is illustrated in FIG. 4A (side view looking strait through retaining pin hole 6) and FIG. 4B (side view looking vertically at retaining pin hole 6). This embodiment is the retaining pin 4 which has a hole in the retaining pin 6. This hole in retaining pin 6 can be made any size to accommodate the retaining pin clip 5. The retaining pin 4 has a widened head 11 widened enough that it does not fit through the holes in attachment bracket 12. This retaining pin 4 can be made to any size as long as it is made to fit through the hollow tube 3 and the holes in attachment bracket 12 with very little play or wiggle. The retaining pin 4 must be long enough that the retaining pin hole 6 extends out past both ends of the pushing surface attachment bracket 8 so the retaining pin clip 5 can be inserted into hole in retaining pin 6. This retaining pin 4 can be made of any metal, hard plastic or composite.

DETAILED DESCRIPTION—FIG. 5

This illustration shows the assembly of all embodiments. First take the pry bar handle 1, the foot 2 and hollow tube 3 which are already assembled. Then align the hollow tube 3 with the holes in attachment bracket 12 so that holes are on either side of hollow tube 3. Then fully insert small end of retaining pin 4 through both holes in attachment bracket 12 and hollow tube 3 aligned in-between them. Then insert retaining pin clip 5 into hole in retaining pin 6.

DETAILED DESCRIPTION—FIG. 6

This illustration shows the tool with all embodiments assembled and in use.

Operation—FIG. 5-6

Once all embodiments are assembled as shown in FIG. 5 the tool is ready for use shown in FIG. 6. First position pushing surface face 7 against the surface to be pushed upon 10. Then position the heel of the foot 2 against a leverage surface 9 so that both surfaces 10 and 9 have contact at the same time by tool. Then using the pry bar handle 1 pull to produce leverage force at foot 2 and move the pushing surface face 7 against the surface to be pushed upon 10 forcing it outward into desired position. The connection between the pushing surface attachment bracket 8 and the hollow tube 3 will allow movement so that the pushing surface face 7 will keep the same angle of contact on surface to be pushed upon 10. If you feel a different pushing surface face head FIG. 2A-2C will produce better results simply remove retaining pin clip 5 and retaining pin 4 then choose a different pushing surface face head FIG. 2A-2C and reassemble as shown in FIG. 5 and explained in DETAILED DESCRIPTION-FIG. 5.

Alternative Embodiments

There are various possibilities of all embodiments. The pry bar handle 1 shown in FIGS. 1A-B can be any length and width and be made from any number of substances. The foot 2 shown in FIGS. 1A-B can also be any length and width and be made from any number of substances. The hollow tube 3 shown in FIGS. 1A-1B can be any length or diameter desired and be made of any number of substances. The pushing surface face head shown in FIGS. 2A-2C can be made any shape size and contour for desired application and can be made of any number of substances and be coated with plastic or rubber etc. The pushing surface attachment brackets 8 shown in FIGS. 2A-2C can be made to any size shape or thickness so long as they can have adequate room for the holes in attachment bracket 12 shown in FIGS. 2A-2C which can be made to any size to match the inside diameter of hollow tube 3 shown in FIGS. 1A-1B and can be made of any number of substances. The retaining pin 4 shown in FIGS. 4A-4B can also be made to any size diameter as long as to match inside diameter of hollow tube 3 shown in FIGS. 1A-1B and long enough to fit through the both ends of the pushing surface attachment bracket 8 shown in FIGS. 2A-2C. The retaining pin 4 should extending outward enough past pushing surface attachment bracket 8 to revile hole in retaining pin 6 shown in FIGS. 4A-4B. This retaining pin 4 shown in FIGS. 4A-4B can be made of any number of materials. The hole in retaining pin 6 shown in FIGS. 4A-4B can be made to any size as long as it is not smaller than the diameter of the retaining pin clip 5. The retaining pin clip 5 shown in FIG. 3 can be any size as long as it is not thicker than the diameter of the hole in retaining pin 6 shown in FIG. 4A-4B and long enough to fit entirely through retaining pin 4. The retaining pin clip 5 can be made of any number of materials.

Advantages

From the description above, a number of advantages of some embodiments of my tool become evident:

(a) A way to push out a surface with speed and very little effort.

(b) The ability to quickly change pushing surface heads for any application.

(c) The ability to reach and push areas previously unreachable.

(d) Being able to push on an area without dimpling and stretching it.

(e) The ability to push on an area instead of having to weld something to for pulling purposes and warping and weakening the area.

(f) The ability to push with force on the back side and give you a sturdy backing to hammer against.

(g) The ability to push on a surface with the exact contour it needs to be shaped to.

(h) The ability to keep your pushing surface face at the same angle against the area being pushed upon though the pushing movement.

CONCLUSION, RAMIFICATIONS, AND SCOPE

Accordingly, the reader will see that the prying tool of the various embodiments can be used to pry and push many surfaces easily and conveniently with very little effort that previously were very difficult or impossible. Furthermore, the prying tool has the additional advantages in that;

- it provides the ability to quickly change pushing surface heads to fit the contour and desired shape of surface being pushed upon.
- it provides the ability to easily reach and push areas that were previously difficult or impossible to reach.

- it provides the ability to push on an area with the proper shape to reshape and avoid dimpling and stretching.
- it provides the ability to push on an area that previously would have needed pins or tabs welded to it to pull from avoiding the warping and weakening of the area.
- it provides the ability to push with force on the back side of a surface and give you a sturdy backing to hammer against.
- it provides the ability to push on a surface with the exact contour it needs to be shaped to.
- it provides the ability to keep the pushing surface face at the same angle against the area being pushed upon throughout the pushing movement.

Although the description above contains many specificities, these should not be construed as limiting the scope of embodiments but merely providing illustrations of some of several embodiments. For example, the tool can be made various shapes and sizes. The pry bar handle can be any length or width. The leverage foot can be any length and width. The pushing surface heads can be made to any size, shape or contour desired and the hollow tube, retaining pin, retaining pin clip and pushing surface bracket can be made to any size desired.

All parts can also be made of any number of materials ranging from but not exclusive to steel, aluminum, plastic or composites, etc. The connection between the leverage foot and pushing surface head can be done many other ways—for instance the hollow tube can be attached to the pushing surface head and the attachment bracket to the foot or the hollow tube could be solid and the attachment bracket had arms to squeeze around it etc. All that is important is that the foot can connect to the pushing surface head and can move independently. Also any type of adjustable pry bar can be used where the foot can change angle at the connection at the bar or be solid. The length of the bar can also be adjustable to be longer or just be solid.

Thus the scope of the embodiments should be determined by the appended claims and their legal equivalents, rather than by the examples given.

I claim:

1. A hand tool having said tool comprising a handle, a foot with a first and second end with said first end attached to said handle, said second end having a tube wherein said foot has a curved profile and a flat arcuate surface with said tube extending across said second end, and a pushing surface face comprising a surface including bracket being moveably attached to said tube.

2. The hand tool of claim 1, wherein said bracket surface being curved.

3. The hand tool of claim 1, wherein said bracket surface being flat.

4. The hand tool of claim 1, wherein said tool is made out of plastic.

5. The hand tool of claim 1, wherein said tool is made out of metal.

6. The hand tool of claim 1, wherein said second tube end is hollow and a pin which is inserted into said hollow tube.

7. The hand tool of claim 6, wherein said pin including an aperture and enlarged head, and a cotter pin which is inserted into said aperture of said pin.

* * * * *